Nov. 3, 1953  A. E. LYONS  2,657,468
INSPECTION GAUGE
Filed April 12, 1952
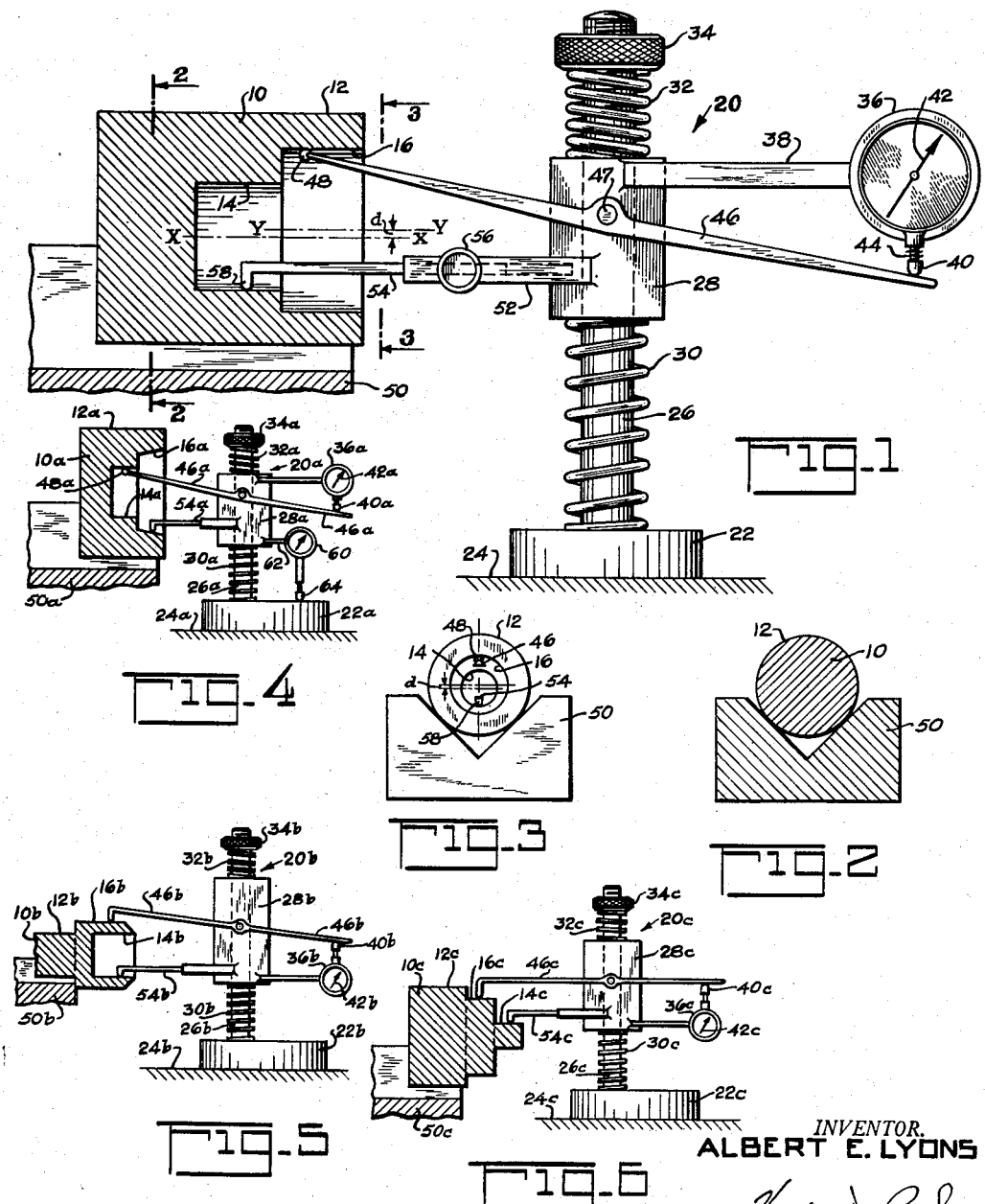
INVENTOR.
ALBERT E. LYONS
BY
ATTORNEY Patented Nov. 3, 1953

2,657,468

UNITED STATES PATENT OFFICE 2,657,468

INSPECTION GAUGE

Albert E. Lyons, Midland Park, N. J., assignor to Curtiss-Wright Corporation, a corporation of Delaware Application April 12, 1952, Serial No. 282,043

3 Claims. (Cl. 33—172)

This invention relates to inspection gages and is particularly directed to an inspection gage for determining the lack of coincidence, if any, of the parallel axes of two surfaces of revolution.

In the case of a body having two surfaces of revolution whose axes are intended to be coaxial and it is not readily possible to rotate said body about the axis of either of said surfaces, it has been the practice to make a separate determination of the eccentricity, if any, of the axis of each said surface with respect to the axis of a surface also intended to be co-axial with said first two surfaces. From these separate determinations the eccentricity of the axes of said two surfaces of revolution relative to each other could be determined. An object of the present invention comprises the provision of a novel and simple inspection gage for directly indicating any eccentricity of the axes of two surfaces of revolution of a body while said body is being rotated about another axis.

Other objects of the invention will become apparent upon reading the annexed detailed description in connection with the drawing in which:

Fig. 1 is a side elevational view of an inspection gage embodying the invention;

Figs. 2 and 3 are sectional views to a reduced scale taken along line 2—2 and 3—3 respectively of Fig. 1; and Figs. 4, 5 and 6 illustrate modifications of Fig. 1.

Referring first to Figs. 1–3 of the drawing, a part 10 has an external cylindrical surface 12 and has a pair of internal cylindrical surfaces 14 and 16. The surfaces 14 and 16 are intended to be co-axial with respect to each other and with respect to the external cylindrical surface 12. Due to manufacturing tolerances and/or errors the axis X—X of the surface 14 may be laterally displaced from the axis Y—Y of the surface 16 a distance d, as best seen in Fig. 1. An inspection gage 20 has been provided for directly indicating the magnitude of the eccentricity d while the part 10 is rotated about the axis of the surface 12. As will appear, the operation of the inspection gage 20 is not affected by any lateral eccentricity of the external cylindrical surface 12 relative to either or both of the axes of the surfaces 14 and 16 such as results from manufacturing tolerances and/or small manufacturing errors.

The gage 20 comprises a base portion 22 for supporting the gage on a horizontal surface such as the surface 24. A post 26 is secured to the base 22 and extends upwardly therefrom at right angles to the horizontal surface 24. The post 26 extends through a slide or body member 28 which is slidably movable along said post. A first compression spring 30 is disposed between the base 22 and the body member 28 and a second compression spring 32 is disposed between the body member 28 and a nut 34 adjustably threaded on the upper end of the post 26. Thus the nut 34 is adjustable to vary the compression of the spring 32 thereby changing the intermediate position along the post 26 toward which the body member 28 is urged by the springs 30 and 32. That is, the nut 34 is adjustable to vary the normal position of the body member 28 along the post 26.

A conventional dial indicator 36 is supported on the body member 28 by bracket 38. The dial indicator 36 includes an axially movable plunger or spindle 40 which is geared to the dial pointer 42 so that axial movements of the spindle cause rotational movements of the point 42. A spring 44 urges the spindle 40 toward its extended position. For purposes of illustration, the spring 44 has been shown as disposed about the external portion of the spindle 40. Actually, however, in the common conventional dial indicator the spring 44 is disposed within the indicator.

An arm 46 is pivotally supported on the body member 28 at 47 intermediate the ends of said arm. One end of the pivotally supported arm 46 has a contact portion 48 which is arranged to engage one of the cylindrical surfaces 14 and 16. As illustrated the contact portion 48 of the arm 46 is disposed in engagement with the surface 16 of the part 10 while said part is supported on a horizontal V-block 50 with the external cylindrical surface 12 of said part being received between the sides of the horizontal V-shaped channel of said block 50. The other end of the pivotally supported arm 46 is disposed in engagement with the spindle 40 of the dial indicator 36. The spring pressed spindle 40 of the dial indicator 36 holds the contact end 48 of the arm 46 in engagement with the cylindrical surface 16.

A hollow bracket member 52 is also secured to the body member 28 and projects laterally therefrom. An arm 54 has one end slidably fitted within said bracket member 52 and a screw 56 serves to anchor the arm 54 in various positions of longitudinal adjustment along said member 52. The other end of the arm 54 has a contact portion 58 disposed in engagement with the cylindrical surface 14. The points of engagement of the contact arms 46 and 54 with the surfaces 16 and 14, respectively, are disposed on substantially opposite sides of the axis of the part 10, as best seen in Fig. 3.

In use, the gage 20 must be positioned and the nut 34 adjusted so that the contact end 58 of the arm 54 is resiliently held down against surface 14 by the spring 32. The gage parts are so dimensioned, that with the contact end 58 of the arm 54 resiliently held down against the surface 14, the contact end 48 of the arm 46 is resiliently held up against the surface 16 by the spring pressed dial spindle 40.

With the parts in the position illustrated in Fig. 1, the part 10 is rotated in the V block 50 whereupon the arm 54 and springs 30 and 32 will cause the body member 28 to move vertically along the post 26 in response to any eccentricity between the axis X—X and the surface 14 and the horizontal axis of the external surface 12 about which the body 10 is being rotated. The arm 46 and dial indicator 36 are also supported on the body member 28 so that the dial indicator will respond only to a lack of co-incidence of the axis X—X and Y—Y regardless of any small lateral eccentricity of either or both said axes with respect to the axis of the surface 12 such as results from manufacturing tolerances and/or small manufacturing errors. Thus the dial indicator 36 will directly indicate the eccentricity d. If the two moment arms of the pivotally mounted arm 46 are equal then the eccentricity d will be equal to one-half the maximum deflection range of the dial pointer 42 as the part 10 is rotated through at least one revolution. For convenience, the gage 20 has been described as being supported on a horizontal surface with the post 26 upright. Obviously, however, the gage may be used in any position provided only that the relative positions of the gage and the axis of rotation of the part to be inspected is the same as illustrated. That is, the axis of the post 26 should be transverse to the axis of rotation of the part 10.

As illustrated in Fig. 1, the pivotal mounted contact arm 46 of the gage 20 engages the larger diameter cylindrical surface 16 while the other contact arm 54 engages the smaller diameter cylindrical surface. Obviously, however, the gage may be designed so that the pivotally mounted arm engages the smaller of the two cylindrical surfaces. In addition, instead of cylindrical surfaces of revolution, the surfaces 14 and 16 may be any surface of revolution. Thus either or both the surfaces 14 and 16 may be a conical surface of revolution. For example, the surface 14 may be cylindrical and the surface 16 is conical. Such a gage is illustrated in Fig. 4. In addition, a second dial indicator has been added to the gage in Fig. 4. Except for this addition the gage of Fig. 4 is basically the same as that of Fig. 1 and those portions of Fig. 4 corresponding to the portions of Fig. 1 have been designated by the same reference numerals but with a subscript a added thereto.

In Fig. 4, the pivotally mounted contact arm 46 engages the annular conical surface 16a and the other contact arm engages the annular cylindrical surface 14a. In addition, a second dial indicator 60 is supported on the body member 28a by a bracket 62. The dial indicator 60 has an axially movable plunger or spindle 64 which is resiliently held against the horizontal base 22a of the gage 20a. Accordingly, as the part 10a is rotated about the axis of the external cylindrical surface 12a, as provided by the V-block 50a, the dial indicator 60 will indicate directly the lateral eccentricity, if any, of the axis of the surface 16a relative to the axis of the surface 12a. At the same time the dial indicator 36a indicates the lateral eccentricity, if any, of the axes of the surfaces 14a and 16a. Obviously such a second dial indicator 60 may also be added to Fig. 1 in which case the second dial would directly indicate the lateral eccentricity, if any, between the axis of the surface 14 and the axis of the surface 12. Except for the differences discussed, the gage 20a is like the gage 20 of Fig. 1.

In the gages of Figs. 1 and 4, the gage directly indicates the lateral eccentricity, if any, between the parallel axes of two internal surfaces of revolution of a part while the part is being rotated about the axis of a third surface intended to be co-axial with said other two surfaces. As will be apparent, however, the gage may be modified to indicate the eccentricity between the parallel axes of an internal annular surface and an external annular surface, or between two external surfaces, of a part as said part is being rotated about the axis of a third surface. Such modifications are illustrated in Figs. 5 and 6.

In Fig. 5, the portions corresponding to the portions of Fig. 1 have been designated by like reference numerals but with a subscript b added thereto. In Fig. 5, a part 10b has an external cylindrical surface 16b engaged by the pivotally mounted gage arm 46b and an internal cylindrical surface engaged by the other gage arm 54b. The part 10b has a third cylindrical surface 12b having a horizontal axis parallel to the axes of the surface 14b and 16b. In addition the part 10b is mounted with its surface 12b disposed in a V-block 50b for rotation about the axis of said surface. The remainder of the gage 36b is essentially the same as the gage 36 of Fig. 1. Accordingly in Fig. 5 the gage 36b directly indicates the lateral eccentricity, if any, between the axes of the surfaces 14b and 16b.

In Fig. 6, the portions corresponding to the portions of Fig. 1 have been designated by like reference numerals but with a subscript c added thereto. In Fig. 6, a part 10c has an external cylindrical surface 16c engaged by the pivotally mounted gage arm 46c and has a second external surface 14c engaged by the other gage arm 54c. The part 10c has a third cylindrical surface 12c having a horizontal axis parallel to the axes of the surfaces 14c and 16c. In addition, the part 10c is mounted with its surface 12c disposed in a V-block 50c for rotation about the axis of said surface. Except for the differences discussed the gage 36c is essentially the same as the gage 36 of Fig. 1. Therefore as the part 10c is rotated in the V-block 50c, the dial indicator 36c directly indicates the eccentricity, if any, between the axes of the surfaces 14c and 16c.

A second dial indicator disposed similar to the dial indicator 60 of Fig. 4 may obviously be added to the gage 36b and/or to the gage 36c.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. An inspection gage comprising a post member; a body member mounted on the post member for movement therealong; a first spring disposed between one end of said post member and said body member for urging said body member in one direction along the post member; a second spring disposed between the other end of said post member and said body member for urging said body member in the other direction along the post member; adjustable means carried by the post member for varying the force of one of said springs on said body member; a first arm secured to the body member for movement therewith; a second arm pivotally mounted on the body member; and a dial indicator mounted on the body member and engageable with the pivotally mounted arm for indicating pivotal movement of said second arm wtih respect to said first arm.

2. An inspection gage for determining the magnitude of any lack of co-incidence of the parallel axes of two surfaces of revolution of a part; said gage comprising a support member; a body member mounted for movement along a linear path relative to said support member; a first spring acting between said support member and body member and urging said body member in one direction along said path; a second spring acting between said support member and body member and urging said body member in the opposite direction along said path; a first arm secured to said body member for joint movement therewith and engageable at one end with one of said surfaces; adjustable means carried by said support member for varying the force of one of said springs for urging said arm end toward contact with said one surface; a second arm engageable at one end with the other of said surfaces and pivotally mounted on the body member for pivotal movement with respect to said body member in response to changes in the spacing between the surface contacting ends of said arms, the points of engagement of said arms with said surfaces being on opposite sides of said axes, spring means acting between said body member and said second arm for pivotally urging said end of said second arm toward contact with said other surface; and means for indicating pivotal movement of said second arm relative to said first arm and body member.

3. An inspection gage for determining any lack of co-incidence of the parallel axes of two surfaces of revolution of a part; said gage comprising a support member having a post extending therefrom; a body member mounted on said post for movement therealong; a first spring carried by said support member for urging said body member in one direction along said post; a second spring carried by said support member for urging said body member in the opposite direction along said post; a first arm secured to the body member for joint movement therewith and engageable at one end with one of said surfaces; adjustable means carried by said support member for varying the force of one of said springs for urging said arm into contact with said one surface; a second arm engageable at one end with the other of said surfaces and pivotally mounted on the body member for pivotal movement with respect to said body member in response to changes in the spacing between the surface contacting ends of said arms the points of engagement of said arms with said surfaces being on opposite sides of said axes; spring means acting between said second arm and said body member for pivotally urging said end of said second arm toward contact with said other surface; and means for indicating pivotal movement of said second arm relative to said first arm and body member.

ALBERT E. LYONS.

References Cited in the file of this patent

UNITED STATES PATENTS

| Number | Name | Date |
|---|---|---|
| 2,427,152 | Moore | Sept. 9, 1947 |
| 2,480,891 | Van Winkle | Sept. 6, 1949 |